United States Patent
Lund et al.

(10) Patent No.: US 6,757,652 B1
(45) Date of Patent: *Jun. 29, 2004

(54) MULTIPLE STAGE SPEECH RECOGNIZER (75) Inventors: Michael Lund, Newton, MA (US); Karl Wright, Lexington, MA (US); Wensheng Fan, Malden, MA (US)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,119

(22) Filed: Mar. 3, 1998

(51) Int. Cl.[7] .............................................. G10L 15/04
(52) U.S. Cl. .................................... 704/254; 704/252
(58) Field of Search ............................... 704/231, 236, 704/251, 254, 255, 256, 239, 252

(56) References Cited

U.S. PATENT DOCUMENTS

| | | | | |
|---|---|---|---|---|
| 4,882,757 A | * | 11/1989 | Fisher et al. | 704/253 |
| 5,708,704 A | * | 1/1998 | Fisher | 379/406.08 |
| 5,719,997 A | * | 2/1998 | Brown et al. | 704/257 |
| 5,778,340 A | * | 7/1998 | Hattori | 704/244 |
| 5,805,772 A | * | 9/1998 | Chou et al. | 704/255 |
| 5,832,428 A | * | 11/1998 | Chow et al. | 704/254 |
| 5,850,627 A | * | 12/1998 | Gould et al. | 704/231 |

* cited by examiner

Primary Examiner—Richemond Dorvil
Assistant Examiner—Angela Armstrong (57) ABSTRACT

A speech recognition approach that involves forming a series of segments associated with a spoken utterance. Each segment has a time interval within the utterance, and scores characterizing the degree of match of the utterance in that time interval with a set of subword units. Based on the series of segments, the approach includes determining a set of word sequences hypotheses associated with the utterance and then computing scores for the set of word sequence hypotheses using a second set of subword units to represent words in the word sequence hypotheses.

9 Claims, 6 Drawing Sheets

MULTIPLE STAGE SPEECH RECOGNIZER

BACKGROUND

The invention relates to an automatic speech recognizer which uses multiple processing stages to determine the words contained in a spoken utterance.

Real-time speech recognition can be implemented on a variety of types of computers. An implementation of a speech recognizer, in general, uses a digital signal processor, a general purpose processor, or both. Typical digital signal processors (DSPs, such as the Texas Instruments TMS320C31) are suited for computationally intensive tasks, such as signal processing, and for low latency processing. However, available memory to a DSP is generally limited, in part, due to the cost of memory devices that allow the DSPs to execute at their full speed (i.e., without memory wait states). General purpose processors (such as the Intel Pentium) can, in general, support more memory, which is generally less costly than DSP memory, but the processors are not tailored to signal processing tasks.

A speech recognition algorithm implemented on a DSP based computer, in general, has a vocabulary size and linguistic complexity that is limited by memory resources associated with the DSP. More complex speech recognition algorithms, for example supporting larger vocabularies, have been implemented using computers based on general purpose processors, as have "N-best" algorithms that produce multiple alternative hypotheses, rather than a single most best hypothesis, of what was said.

A speech recognition algorithm that is implemented using both a DSP and a general purpose processor often relies on the DSP to perform signal processing tasks, for example computing spectral features at regular time intervals. These spectral features, such as linear predictive coefficients, cepstra, or vector quantized features, are then passed from the DSP to the general purpose processor for further stages of speech recognition.

Figure 1:
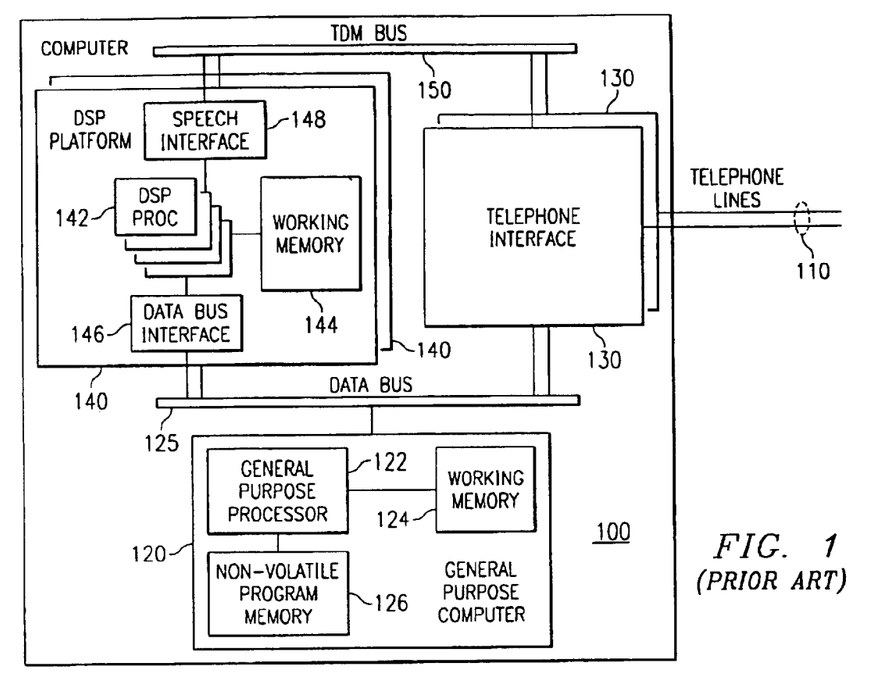
FIG. 1 is a multiprocessor computer for recognizing speech input from multiple telephone lines.

Speech recognition has been applied to telephone based input. PureSpeech Inc. has previously released a software product, Recite 1.2, that recognizes utterances spoken by telephone callers. A computer architecture on which this product can be executed is shown in FIG. 1. Computer 100 is used to interact by voice with callers over multiple telephone lines 110. Computer 100 automatically recognizes what the callers say, and can play prompts to interact with the callers. Computer 100 includes one or more telephone interfaces 130 coupled to a general purpose computer 120, such as a single-board computer, over a data bus 125. General purpose computer 120 includes a general purpose processor 122, working memory 124, such as dynamic RAM, and non-volatile program memory 126, such as a magnetic disk. Alternatively, program memory can reside on another computer and be accessed over a data network. Telephone interfaces 130 provide an interface to telephone lines 110 over which callers interact with the computer. Also coupled to general purpose computer 120 over data bus 125 are one or more DSP platforms 140. DSP platforms 140 are coupled to telephone interfaces 130 over a second bus, time division multiplexed (TDM) bus 150. TDM bus 150 can carry digitized speech between DSP platforms 140 and telephone interfaces 130. Each DSP platform 140 includes multiple DSP processors 142, working memory 144, a data bus interface 146 to data bus 125, and a speech interface 148 to TDM bus 150. In one version of the Recite 1.2 product, general purpose processor 122 is an Intel Pentium, data bus 125 is an ISA bus, DSP platform 140 is an Antares DSP platform (model 2000/30, 2000/50, or 6000) manufactured by Dialogic Corporation, and TDM bus 150 is a SCSA bus which carries telephone signals encoded as 8-bit speech samples sampled at a 8 kHz sampling rate. Each Antares DSP platform includes four DSP processors 142, TMS320C31 processors manufactured by Texas Instruments. Working memory 144 includes 512 KB of static RAM per DSP and 4 MB of dynamic RAM shared by the four DSP processors 142. Telephone interfaces 130 are any of several interfaces also manufactured by Dialogic corporation, including models D41ESC, D160SC, and D112SC. For instance, each D112SC interface supports twelve analog telephone lines 110.

PureSpeech Inc.'s Recite 1.2 product incorporates a speech recognition approach related to that described in U.S. Pat. No. 5,638,487, "AUTOMATIC SPEECH RECOGNITION", (the '487 patent) which is incorporated herein by reference. In that implementation, each DSP processor on the DSP platforms is associated with exactly one telephone channel. A DSP associated with a particular telephone channel hosts initial stages of the recognition approach that are shown in FIG. 3 of the '497 patent. In addition, an echo canceler stage is also included on the DSP prior to the spectral analyzer in order to reduce the effect of an outbound prompt on an inbound utterance. The DSP is essentially dedicated to the single task (process) for accepting input received from the TDM bus, processing it, and passing it to the general purpose computer. The output of the phonetic classifier is sent to the general purpose computer where a sentence level matcher is implemented. The sentence level matcher can provide multiple sentence hypotheses corresponding to likely utterances spoken by a talker.

In many speech based telephone applications, a caller is talking for a relatively small fraction of the time of a telephone call. The remainder of the time is consumed by playing prompts or other information to the caller, or by quiet intervals, for example while information is being retrieved for the caller. In the Recite 1.2 software product, one DSP is allocated for each telephone interaction, regardless of whether a caller is talking, or a prompt or information is being played. This is necessary, for example, as a caller may begin speaking before a prompt has completed. Therefore, in order to support 12 concurrent telephone conversations, three Antares DSP platforms with four DSPs each are needed to host the initial stages of the recognition approach.

Speech recognition approaches have been adapted to large vocabularies, such as lists of names in the range of 1000 to 10000 names. One aspect of recognition approaches used to achieve adequate accuracy on such large vocabularies is that a large number of subword model parameters, or a large number of subword models themselves, is typically used. A phonetic classifier is hosted on the DSP in the Recite 1.2 software. As the static RAM used for storage related to the subword models, and the amount of static RAM available to each DSP is limited, the number of subword models and their parameters is limited. This memory limitation can impact accuracy on some large vocabulary tasks.

SUMMARY

In one aspect, in general, the invention is software stored on a computer readable medium for causing a multiprocessor computer to perform the function of recognizing an utterance spoken by a speaker. The software includes software for causing a first processor, such as a DSP processor, to perform the function of computing a series of segments associated with the utterance, each segment having a time interval within the utterance, and scores characterizing the degree of match of the utterance in that time interval with a first set of subword units, and sending the series of segments to a second processor. The software also includes software for causing the second processor, such as a general purpose processor, to perform the functions of receiving the series of segments, determining multiple word sequence hypotheses associated with the utterance, and computing scores for the word sequence hypotheses, using a second set of subword units to represent words in the word sequence hypotheses. The first set of subword units can be a set of phonemes, and the second set of subword units can be a set of context dependent phonemes.

In another aspect, in general, the invention is a method for recognizing the words in a spoken utterance. The method includes accepting data for the spoken utterance and forming a series of segments associated with the utterance. Each segment has a time interval within the utterance, and scores characterizing the degree of match of the utterance in that time interval with a set of subword units. Based on the series of segments, the method includes determining a set of word sequences hypotheses associated with the utterance and computing scores for the set of word sequence hypotheses using a second set of subword units to represent words in the word sequence hypotheses.

The invention can include one or more of the following features.

Computing scores for the multiple word sequence hypotheses can include forming a graph representation from the word sequence hypotheses, wherein the graph representation includes representations of words using the second set of subword units, and then computing scores for paths through this graph representation.

Determining the multiple of word sequence hypotheses can include determining a word graph representation wherein each of the word sequence hypotheses is associated with a path through the graph representation.

An advantage of the invention is that a multistage speech recognition can be implemented in part on a DSP processor and in part on a general purpose processor. Multiple channels can be processed by one DSP by taking advantage of the fact that caller is speaking for only a fraction of the time of a call. By sharing a preliminary recognition stage for all the channels serviced by one DSP, memory requirements for that DSP are reduced compared to having a separate preliminary recognizer for each channel. Furthermore, by sharing the preliminary recognizer on an utterance-by-utterance basis, inefficiencies introduced by context switching can be reduced.

Another advantage of the invention is that computation on the DSP can use a limited amount of memory that does not depend on the size of a vocabulary being recognized. Communication of segmental information between the DSP processor and the general purpose processor allows a set of word sequence hypotheses to be computed efficiently on the general purpose computer. By using a set of phonetically-based rules in determining the possible pronunciations of allowable word sequences, the correct word sequence is included with a high probability in the set of word sequence hypotheses that is computed. High accuracy for the top choice of word sequences is then obtained by rescoring these word sequence hypotheses on the general purpose processor, for example using a hidden Markov model (HMM) based recognition approach. This multistage recognizer allows a large number of concurrent recognition channels to be processed simultaneously using one or more DSP processors attached to the general purpose processor, while achieving high recognition accuracy.

Other features and advantages of the invention will be apparent from the following description, and from the claims.

DESCRIPTION

A new speech recognition approach is implemented on the same computer platform, shown in FIG. 1, as has been used to implement previous recognition approaches. In this new recognition approach, each DSP concurrently supports multiple telephone channels. Furthermore, the recognition stages implemented on the general purpose computer include stages that are used to increase accuracy over that achievable using the limited number of subword model parameters that can be stored in the memory associated with each DSP.

Figure 2:
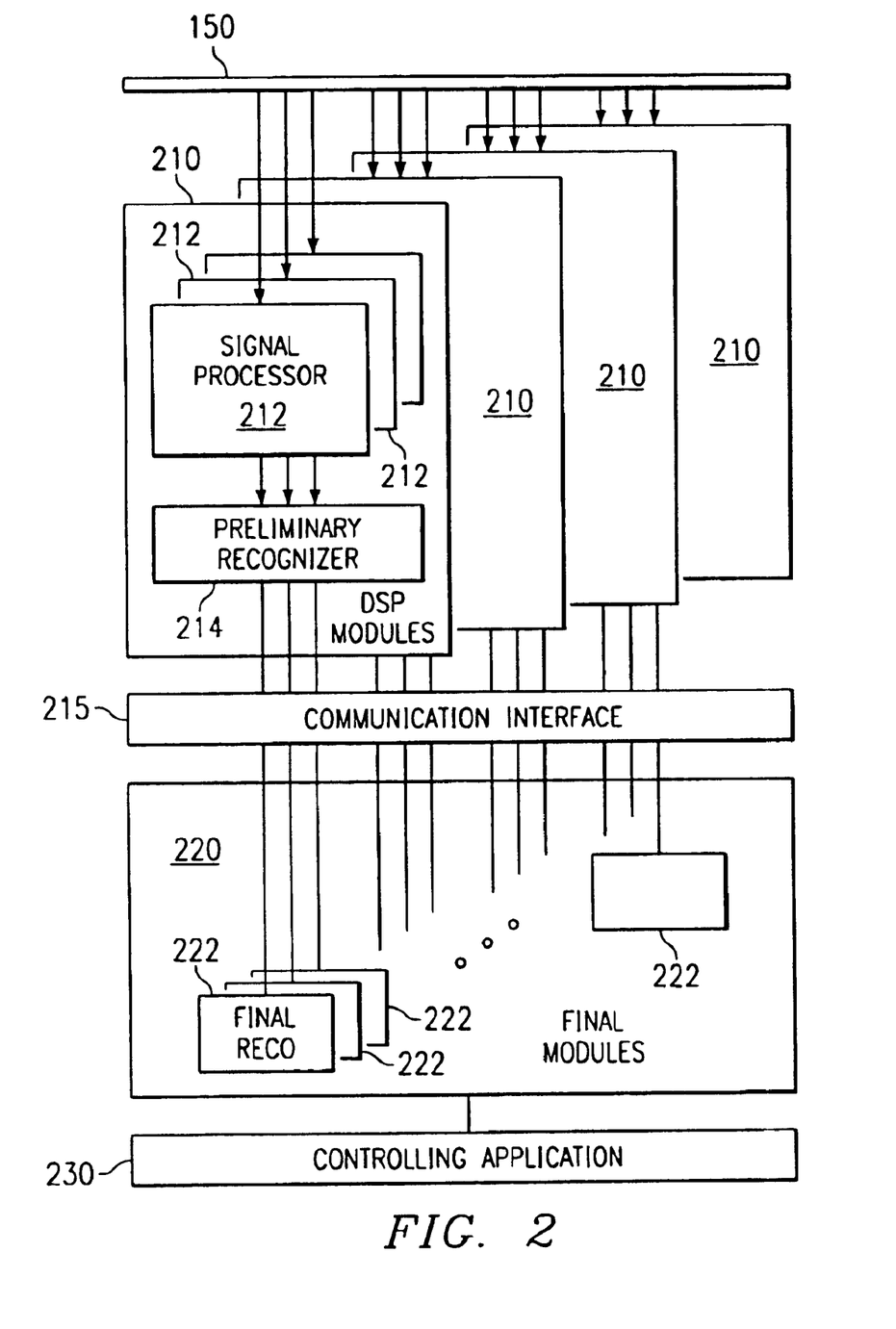
FIG. 2 is a software architecture for recognizing speech input from multiple telephone lines.

Referring to FIG. 1, the new speech recognition approach involves several processing stages which execute either on DSP processors 142 or on general purpose processor 122. These processing stages are used to recognize utterances spoken by callers and input to computer 100 over telephone lines 110. Referring to FIG. 2, each of the DSP processors 142 on a DSP platform 140 executes a set of DSP modules 210. DSP modules 210 for one such DSP processor 142 includes three signal processors 212 and a preliminary recognizer 214. Each signal processor 142 accepts data associated with a single telephone call from TDM bus 150. Preliminary recognizer 214 accepts input from each of signal processors 212 in the same DSP module 210, and processes those inputs in a shared manner such that utterances from each of the signal processors 212 are processed by preliminary recognizer 214 in turn. Each of the preliminary recognizers 214 on a DSP platform 140 communicate through communication interface 215 to final modules 220 which execute on general purpose computer 120. Each signal processor 212 and their associated preliminary recognizer 214 is implemented as a separate processing thread executing on a DSP. Communication interface 215 includes cooperating software that executes in part on DSP platform 140 and in part on general purpose computer 120. Final modules 220 includes one final recognizer 222 for each telephone channel. Therefore each final recognizer 222 corresponds to one of signal processors 212 executing on DSP platform 140. A controlling application 230 also executes on general purpose computer 120 and controls final speech recognizers final modules 220 and DSP modules 210. In this embodiment, controlling application 230 and each of final recognizers 222 execute as separate processing threads within one operating system process. Alternatively, each thread can be implemented as a separate operating system process.

Figure 3:
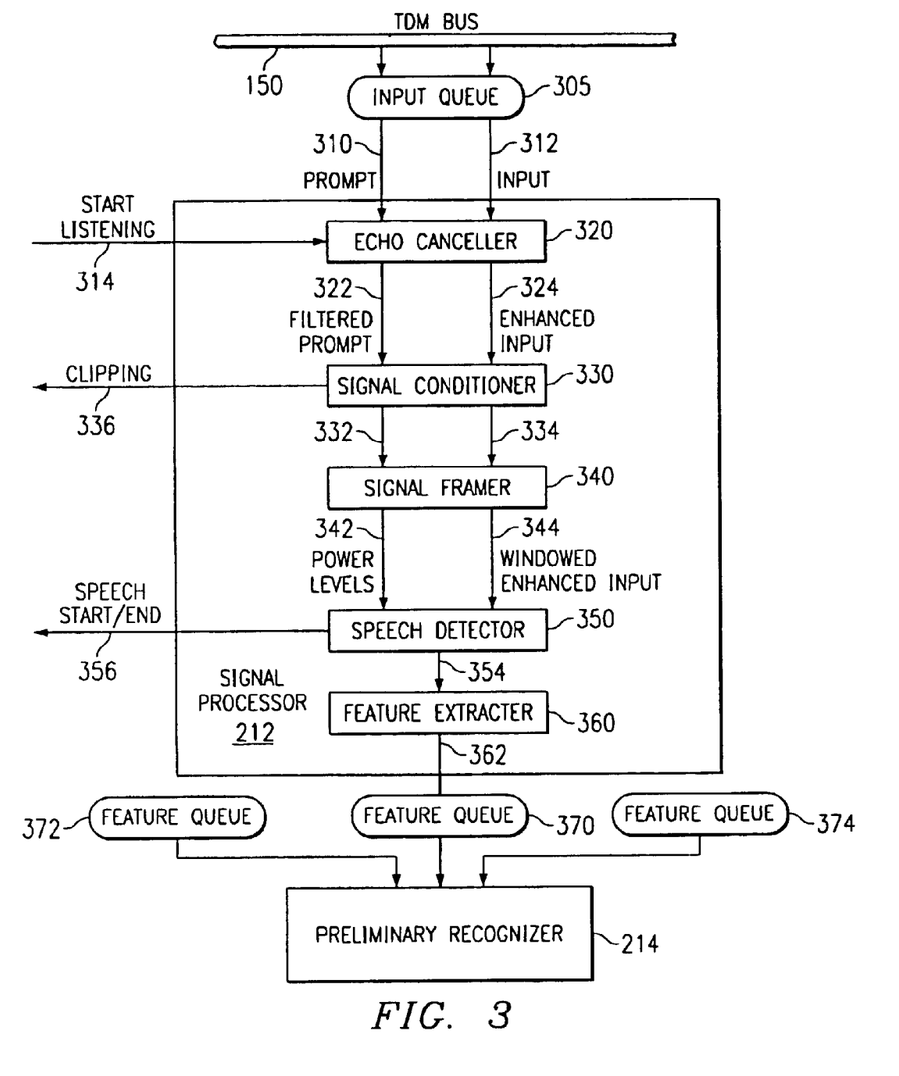
FIG. 3 is a software architecture of a signal processor which executes on a DSP processor.

Referring to FIG. 3, each signal processor 212 implements a pipelined data flow through a series of stages. Signal processor 212 receives two time synchronized signals (for instance as interleaved samples) from an input queue 305. Input queue 305 is filled by an interrupt service routine that passes data from TDM bus 150. The first signal, prompt 310, corresponds to samples of the audio waveform driving the corresponding telephone line, for example, the waveform of a prompt such a "Please say the name of the person you are calling." The second signal, input 312, corresponds to the samples of the waveform received from the telephone line, for example, corresponding to the caller saying "John Smith." The output of signal processor 212 is a sequence of periodically computed spectral features 362. Signal processor 212 provides output only for intervals that it determines that the caller is speaking. Spectral features 362 are stored in a feature queue 370 from which preliminary recognizer 214 dequeues data when an utterance associated with signal processor 212 is processed. Preliminary recognizer 214 also receives data from feature queues 372 and 374, which are associated with the other two of the three signal processors 212 associated with preliminary recognizer 214.

Also shown in FIG. 3 are control and condition signals accepted by and generated by signal processor 212. A "start listening" signal 314 is provided by controlling application 230 executing on general purpose computer 120 to initiate the recognition process for an particular exchange with a caller. As the controlling application, in general, also controls playing of a prompt, it provides start listening signal 314 at approximately the time that the prompt begins playing. Signal processor 212 also provides condition signals to controlling application 230. A clipping condition 336 corresponds to a signal truncation condition that can occur if the input signal is too loud and an analog-to-digital converter in the signal path from the caller to signal processor 212 has exceeded its dynamic range. Also a speech start/end signal 356 is provided to the controlling application to signal the times the caller appears to have started and ended talking. Controlling application 230 can, for example, terminate the playing of a prompt when it receives a start of speech indication, and can provide a terminating prompt, such as a tone, when it receives an end of speech indication.

The first processing stage of signal processor 212, echo canceler 320, enhances input 312. A characteristic of analog telephone lines is that a portion of an outgoing signal is "echoed" in the incoming signal. The source of this echo includes coupling of the incoming and outgoing signal paths in telephone interface 130 at the 2-wire to 4-wire conversion point, the "hybrid" converter, due in part to impedance mismatches. Therefore, input 312 in general includes a filtered (i.e., attenuated, filtered, and delayed) version of prompt 310. Echo canceler 320 attempts to remove the effect of prompt 310 from input 312 to produce an enhanced input 324. Echo canceler 310 also outputs a filtered prompt 322 which is an estimate of the component of input 312 that corresponds to prompt 310.

Figure 4:
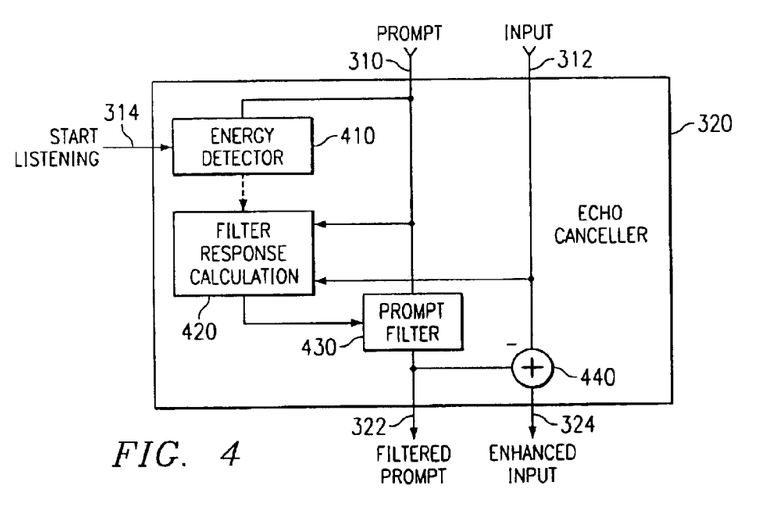
FIG. 4 is a data flow diagram of an echo cancellation module.

Echo canceler 320 implements a signal flow shown in FIG. 4. Echo canceler 320 does not provide any output prior to being triggered using start listening signal 314. When echo canceler 320 receives a start listening signal, an energy detector 410 begins to monitor prompt 310 until prompt 310 exceeds a power threshold. A filter response calculation 420 then buffers both prompt 310 and input 312 for a fixed interval, typically in the order of 0.5 seconds. Based on these buffered signals, filter response calculation 420 computes a response of a linear filter that characterizes the attenuation, filtering, and delay of the buffered prompt to best match the buffered input. Filter response calculation 420 passes the parameters of the filter response to prompt filter 430, which applies the computed linear filter to prompt 310 to produce filtered prompt 322. A summer 440 subtracts filtered prompt 322 from input 312 to produce enhanced input 324.

The second stage of signal processor 212 is a signal conditioner 330. Signal conditioner applies a preemphasis filter (a highpass filter) to filtered prompt 322 and enhanced input 324 to produce preemphasized versions of its inputs, signals 332 and 334 respectively, that are passed to the next processing stage. In addition, signal conditioner 330 detects a clipping condition by comparing the magnitude of enhanced input 324 to a fixed threshold.

The third stage is a signal framer 340. Signal framer 340 accepts its input signals as continuous streams of sampled values. For each sequence of samples corresponding to 10 ms. of speech, signal framer 340 computes a windowed version of the previous 20 ms. of samples, for example, windowed using a Hamming window. Each such windowed sequence of samples is termed a "frame." Signal framer provides energy levels 342, including the power in the successive windowed filtered prompt and the windowed enhanced input, to the next stage. Signal framer 340 also provides a windowed enhanced input 344 to the next stage.

Figure 5:
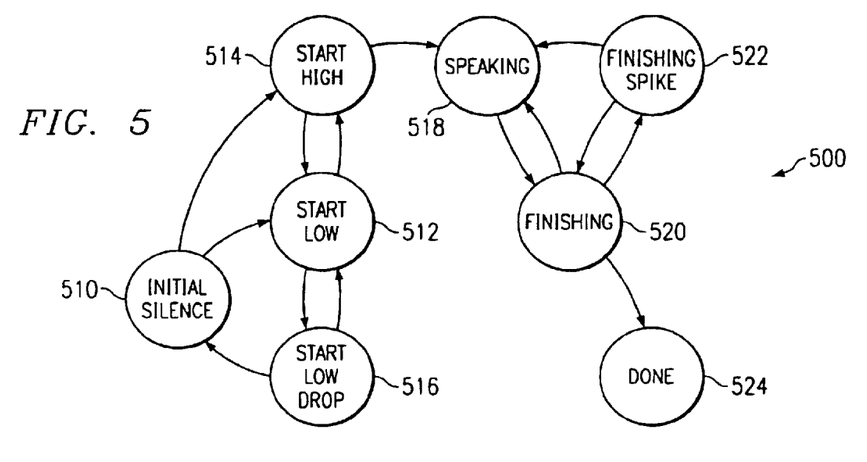
FIG. 5 is a speech detector state machine.

The fourth stage is a speech detector 350. Based on the sequence of energy levels 342, speech detector 350 determines when the caller is likely to have started and ended talking. As it is often difficult to determine when a caller is talking, particularly in the presence of an echo of a prompt, a finite-state machine 500 is implemented by speech detector 350, as illustrated in FIG. 5. Transitions are based on prompt power, which is the power (in decibels) in the windowed filtered prompt computed in the previous stage, and the enhanced input power (in decibels), also computed in the previous stage. Speech detector 350 also maintains two quantities that it adapts as an utterance is processed. The first is an estimate of the noise power in the input signal. This noise power estimate tracks the low power (quiet) intervals in the input, and is increased slowly during intervals that the caller is speaking. Note that in some telephony environments, particularly involving digital wireless telephony, the signal can "drop out" and have zero or very little energy for a short duration. The noise floor tracker detects these drop-outs and does not adjust the noise power estimate to such a zero or low energy value. The second quantity that speech detector 350 adapts is an estimate of the level of the portion of the prompt that was not successfully subtracted from the input signal, expressed as an attenuation level of the filtered prompt. Specifically, the attenuation is computed initially as the power in the enhanced input relative to the power in the filtered prompt. This attenuation level is slowly decreased during an utterance, for example, to account for the characteristics of the echo changing during an utterance. Speech detector 350 computes a single "power" quantity for each 10 ms. frame. If the power in the enhanced input is less than the current estimate of the noise power, the power is set to zero (decibels). Otherwise, if the noise power is greater than the attenuated prompt power, which is the filtered prompt power minus the prompt attenuation, the power is computed as the power in the enhanced input minus the noise power. Otherwise, the power is set to the power in the enhanced input minus the attenuated prompt power.

Referring to FIG. 5 which illustrates finite state machine 500, the initial state of finite state machine 500 implemented by speech detector 350 is an initial silence state 510. Speech detector 350 makes a transition from initial silence 510 to start low 512 or start high 514 if the computed power (described above) crosses a start low or a start high power threshold respectively. From start low 512, if power crosses the start high power threshold, the next state is start high 514, and if power falls below the start low threshold, the next state is start low drop 516. After a threshold duration in start low drop 516, the next state is again initial silence 510. In start low drop 516, if the power once again rises above the start low threshold, the next state is start low 512. In start high 514, if power drops below the start high threshold, the next state is again start low 512. After a threshold duration in start high 514, a start of speech is detected and the next state is speaking 518. When speech detector 350 enters speaking 518, it sends a start of speech signal 356 to controlling application 230, which can terminate playing of a prompt in response to the start of speech signal. In speaking 518, if power falls below a speaking threshold, the next state is finishing 520. Prior to a finishing threshold time in finishing 520, if power goes above the speaking threshold power, the next state is again speaking 518. After the finishing threshold time, if power goes above the speaking threshold, the next state is finishing spike 522. If power stays above speaking threshold for a longer than a spike threshold time, the next state is speaking 518, otherwise, the next state is again finishing 520. After an end of speech threshold time in finishing 520, the next state is done 524. Based on the sequence of states, the speaking interval is estimated to be the time from entering start low 512 or start high 514 to the time leaving finishing 520. Speech detector 350 passes windowed enhanced input 344 for all frames corresponding to this speaking interval to its output 354 (that is, it gates the input signal).

After speech detector 350 has entered the done 524 state, it no longer requests data from earlier stages in the pipeline and signal processor 212 becomes idle until it is again triggered by start listening signal 314.

The fifth stage of the pipeline in signal processor 212 is a feature extractor 360. Feature extractor 350 accepts frames of windowed enhanced input 354 and computes nine cepstal coefficients for each frame it receives. Cepstral coefficients of a frame are the coefficients of the Fourier transformation of the log magnitude spectrum of that frame. Feature extractor 360 also computes "normalized" cepstal coefficients. For each of the cepstral coefficients, feature extractor 350 maintains a decaying average of past values of that coefficient in the utterance being processed. The corresponding normalized cepstral coefficient is the difference of the computed cepstal coefficient and the decaying average. Feature extractor 350 provides features 362, the cepstal and normalized cepstal coefficients, to feature queue 370. Feature queue 370 is large enough so that, typically, even if preliminary recognizer 214 is currently accepting data from another feature queue (372 or 374), the queue is not filled. If output queue 370 fills, signal processor 212 ultimately blocks, and input queue 305 fills with waveform data that is to be processed. Preliminary recognizer 214 dequeues feature data from feature queue 370 when it processes the utterance processed by signal processor 212.

Figure 6:
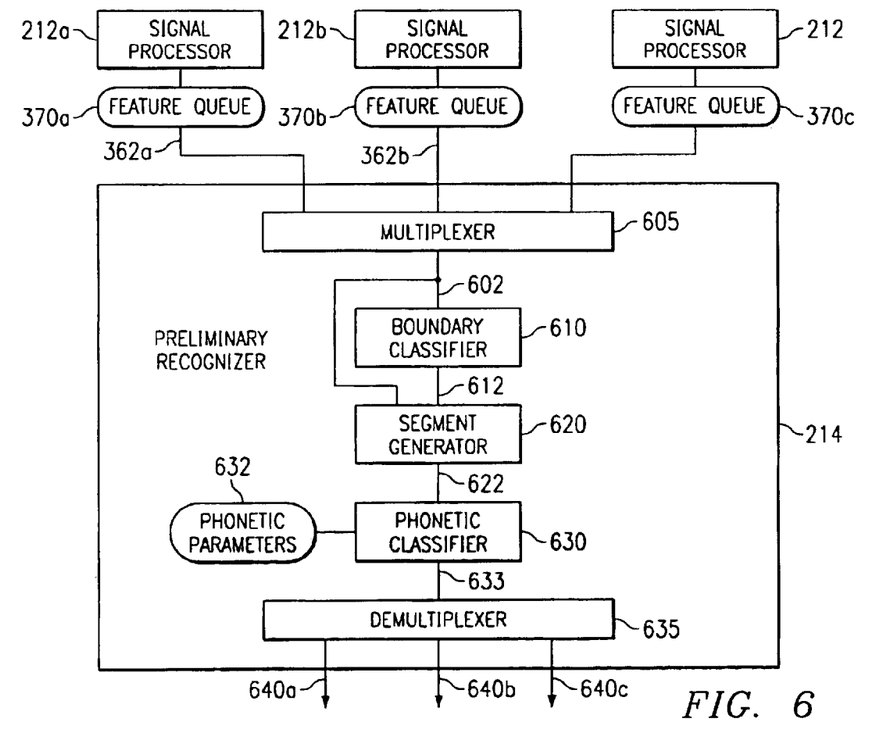
FIG. 6 is a software architecture of a preliminary recognizer which executes on a DSP processor.

Preliminary recognizer 214 implements a boundary detection and segment scoring algorithm described in the '487 patent. Referring to FIG. 6, preliminary recognizer 214 accepts and processes feature data queued in feature queues 370a–c and computed by signal processors 212a–c respectively. A multiplexer 605 cycles between the feature queues, for instance in a round robin fashion, until one of the feature queues can provide data. Preliminary recognizer 214 then services the corresponding signal processor until the caller on the corresponding channel has stopped talking and that feature queue empties. Note that since the outputs of signal processors 212a–c are provided only during intervals that a caller is speaking, in general, typically only one or two signal processors have input available in its feature queue for preliminary recognizer 214. A signal processor 212 can be blocked for a period of time while an utterance for another channel is processed by preliminary recognizer 214. The output signal processor 212 for the blocked channel is queued in the corresponding feature queue 370 until preliminary recognizer 214 can service the blocked channel. Preliminary recognizer 214 includes a demultiplexer 635 at its output that sends its computed results to the output corresponding to the input selected by multiplexer 605.

Preliminary recognizer 214 includes a boundary classifier 610, a segment generator 620, and a phonetic classifier 630, of the design described in the incorporated '487 patent. In particular, boundary classifier 610 accepts features 662, which correspond to the selected one of input features 362a–c, and uses an artificial neural network (ANN) to determine which frames correspond to possible boundaries between phonetic segments. Boundary classifier 610 uses input frames in the vicinity of a possible boundary frame to provide a boundary score 612 (a log probability that the frame is a boundary) for each input frame.

For each input frame, segment generator 620 uses a threshold to determine whether the frame is a boundary candidate and forms multiple segments corresponding to time intervals starting at previous boundary candidate frames and ending at the current boundary candidate frame. For each formed segment, segment generator 620 transforms the input features for that segment's time interval into a fixed length representation of that segment by averaging the normalized cepstral features during three sub-intervals of the segment. Each formed segment 622, which includes its computed fixed length representation as well as the scores of the boundaries of that segment, is passed from segment generator 620 to phonetic classifier 630.

Phonetic classifier 630 uses phonetic parameters 632 to determine the (log) probability that the segment 622 corresponds to each of a fixed set of phonetic labels. Phonetic parameters 630 include the coefficients (weights) of an ANN that has one output for each possible phonetic label, and one input for each of the elements of the fixed length feature representation a segment. The outputs of the ANN are scaled so that they sum to one, and a log is taken of each output. Phonetic parameters 632 and phonetic classifier 630 are combined into an efficient precompiled code module that includes both DSP instructions as well an ANN weights.

Figure 7:
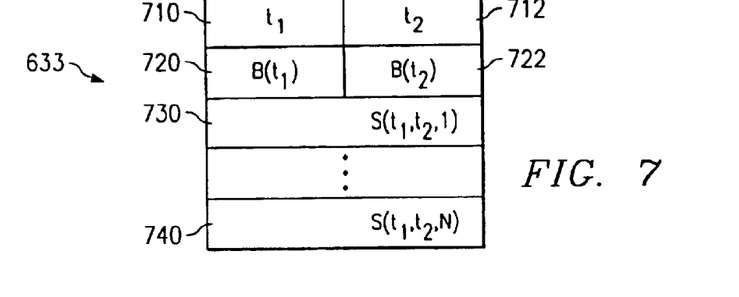
FIG. 7 illustrates segment data that is passed between a DSP and a general purpose processor.

Preliminary recognizer 214 therefore provides as output 633 a series of segments, each segment corresponding to a time interval of the utterance being processed. Referring to FIG. 7, for each segment, preliminary recognizer passes the start and end times $t_1$ 710 and $t_2$ 712, the boundary log probabilities at those times $B(t_1)$ 720 and $B(t_2)$ 722, log probabilities $S(t_1,t_2,1)$ 730 through $S(t_1,t_2,N)$ 740 of a predetermined set of N phonetic units. Preliminary recognizer 212 also passes through unmodified features 362a–c to the corresponding output 640a–c synchronized to the segments being provided. These features are used by final recognizers 222 in subsequent stages of recognition. In this embodiment, scores for N=40 English language phonemes are provided for each segment time interval. In alternative embodiments, scores for only a subset of phonemes could be provided, for instance, the best scoring subset. Also, subword units that are not necessarily phonetically based could alternatively be used.

Figure 8:
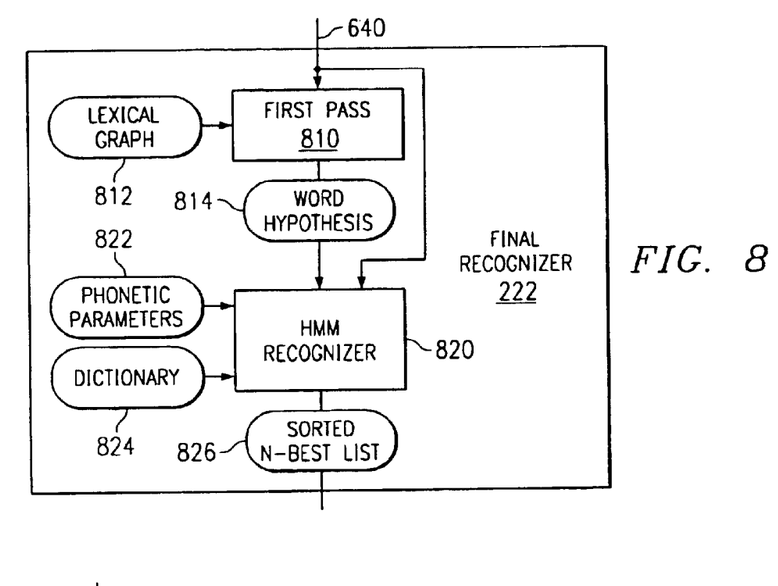
FIG. 8 is a software architecture of a final recognizer which executes on a general purpose processor.

Referring again to FIG. 2, the output of each preliminary recognizer 214 passes through communication interface 215 to a corresponding final recognizer 222. Referring to FIG. 8, final recognizer 222 includes several processing stages. A first pass 810 accepts the segments sent from preliminary recognizer 214 and uses a lexical graph 812 to determine word hypotheses 814 in a manner described below. A hidden Markov model (HMM) recognizer 820 then takes word hypotheses 814 and determines a sorted N-best list 826 using a phonetic dictionary 824 and phonetic parameters 822. Sorted N-best list 826 is provided to controlling application 230 which is responsible for the interaction with the caller on the corresponding telephone line.

Figure 9A:
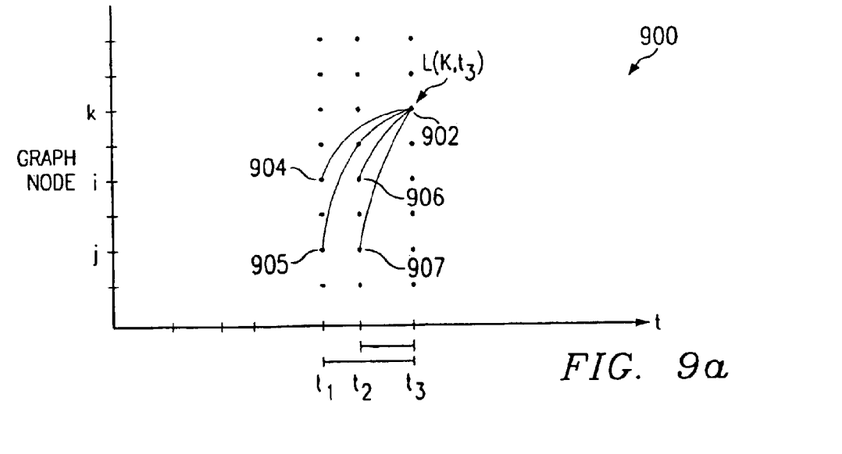
FIG. 9a is a dynamic programming lattice used in forming word sequence hypotheses.
Figure 9B:
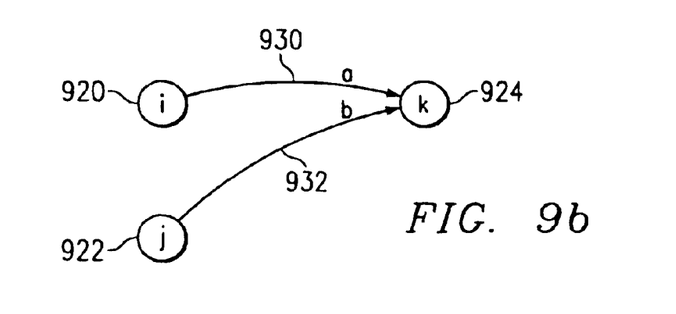
FIG. 9b is a portion of a lexical graph used in forming word sequence hypotheses.

Referring to FIGS. 9a–b, first pass 810 implements a dynamic programming algorithm to determine the sequence of phoneme labels that when concatenated, results in the greatest sum of boundary and phoneme log probabilities. The algorithm is similar to the Viterbi algorithm which is often used in speech recognition algorithms, except that segments of various durations are used.

Lexical graph 812 is a graph representation derived from a specification of allowable word sequences which can be recognized. Arcs in the graph are associated with phoneme labels. At least one node in the graph is designated a starting node and at least one other node in the graph is designated as an ending node. Any path from the starting node to the ending node is associated with a sequence of phoneme labels that corresponds to a pronunciation of an allowable sequence of words. In order to account for alternative pronunciations and coarticulation effects between words, lexical graph 812 is built up in stages in an off-line procedure. In a first stage, a word graph corresponding to allowable word sequences is constructed. Each word is replaced with typically one "standard" phonetic pronunciation (phonetic spelling). Then, phonetic rules are applied to the resulting graph to replace subsequences of phonemes with other subsequences (including removing some subsequences), and to add additional subsequences in addition to those initially appearing the graph. An optimization stage then constructs an equivalent graph using an iterative optimization approach, including merging of paths from the start nodes as well as merging paths back from the ending nodes.

FIG. 9a shows a dynamic programming lattice 900 of scores computed by first pass 810 as part of the dynamic programming algorithm it implements. The horizontal axis corresponds to boundary times, and the vertical axis corresponds to graph nodes. The values in lattice 900 are computed in order of increasing time (from left to right in FIG. 9a). As each segment is accepted by first pass 810, the scores in lattice 900 for the ending boundary time of that segment are updated. After all segments ending at a boundary time have been received, the points in lattice 900 for that ending boundary time contain, for each node in the graph, the greatest sum of phoneme and boundary log probabilities that end at that node at that ending time, and that start at one of the designated starting nodes at some previous boundary time. FIG. 9b shows a portion of a representative graph lexical graph 812. Three nodes, with node indices i 920, j 922 and k 924 are shown. An arc 930 joins nodes i 920 and k 924 and is labeled with phoneme a. Another arc 932 joins node j 922 and node k 924 and is labeled with phoneme b. In this example, arcs 930 and 932 are the only arcs of the lexical graph ending at node k 924. Referring to FIG. 9a, the computation of lattice entry $L(k,t_3)$ 902, the score for node k at boundary time $t_3$, involves considering all segments ending at time $t_3$. In this example, only segments spanning $(t_1,t_3)$ and $(t_2,t_3)$ end at $t_3$. Computation of $L(k,t_3)$ 902 involves finding the best score of a path ending in either phoneme a or phoneme b with the last phoneme segment starting at either $t_1$, or $t_2$. Using the dynamic programming algorithm, first pass 810 chooses this best path by extending from lattice points 904, 905, 906, and 907 and updates lattice entry 902 with the maximum score associated with these extended paths.

After all the segments for an utterance have been received by first pass 810, and all the values in lattice 900 have been computed in the manner described above, first pass 810 first determines the maximum score of any path from a starting node to an ending node by finding the maximum value in a node in lattice 900 associated with an ending node. The first pass 810 then determines a set of phoneme sequences that have path scores within a threshold score of the best score and that also correspond to valid paths through lexical graph 812 from the starting node to the ending node. An A* search (a best first search) is used to find the best phoneme sequences starting at the ending nodes and working backward in time. Each of these phoneme sequences is associated with a particular start time and an ending time. For each phoneme sequence found in the A* search, first pass 810 then determines the word sequence for which that phoneme path is a pronunciation. The list of these word sequence hypotheses, along with their starting and ending times, is provided by first pass 810 to HMM recognizer 820 in word hypotheses 814.

In this embodiment, an HMM recognizer 820 is used to rerank the word sequences in word hypotheses 814 using phonetic parameters 822 and a phonetic dictionary 824. HMM recognizer uses the same time interval, which includes the time interval of all the hypotheses, to determine scores for each of the hypotheses.

Figure 10:
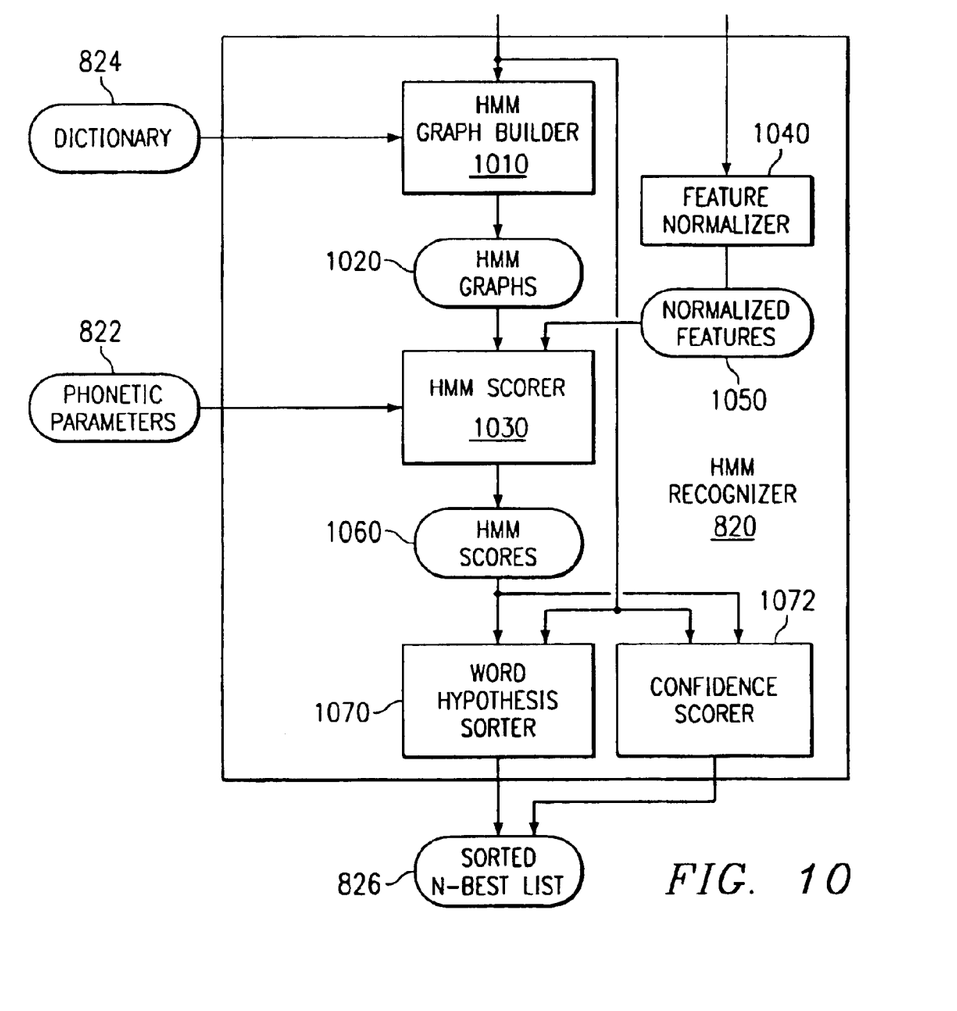
FIG. 10 is a software architecture for an HMM recognizer which executes on a general purpose processor.

Referring to FIG. 10, HMM recognizer includes several stages. An HMM graph builder 1010 accepts the word sequences from word hypotheses 814 and constructs HMM graphs 1020. HMM graphs 1020 include the expansions of each word in word hypotheses 814 into a sequence of nodes corresponding to a phonetic pronunciation of that word, as found in dictionary 824. In this embodiment, a single linear sequence of arcs is formed for each word sequence hypotheses in word hypotheses 814 by concatenating the phoneme pronunciation (phonetic spelling) found in dictionary 824 for each of the words in that sequence. In addition an optional set of filler "phonemes" is inserted at the beginning and the end of the sequence, corresponding to an initial or a final silence or non-speech event before or after the caller has spoken. Filler phonemes can also be used to model out-of-vocabulary speech in word or phrase spotting applications. Also, optional silence or pause phonemes are inserted between each word. Note that the phonetic units and phonetic pronunciations used in dictionary 824 do not necessarily correspond exactly to the phonetic units and pronunciations used in lexical graph 812 (FIG. 8) and processed by first pass 810. Context dependent phoneme models are used in HMM graphs 814. That is, the parameters for a phoneme depend on the phoneme directly before and directly after that phoneme. Inter-word coarticulation effects are accounted for by including the context dependence of a phoneme at the beginning or end of a word to include dependence on the adjacent word.

HMM recognizer 820 accepts (un-normalized) cepstral features for the frames of the utterance being processed. Feature normalizer 1040 takes the entire sequence of cepstal features and computes normalized features 150 by subtracting the mean value over the utterance of each cepstral coefficients from that cepstral coefficients in all the frames in the utterance.

Using techniques commonly used for speech recognition, an HMM scorer 1030 determines the likelihood that of each of the phonetic sequences were uttered by the caller based on normalized features 1050 and on phonetic parameters 822. Phonetic parameters 822 include parameters for context-dependent HMM phoneme models which use a mixture of diagonal covariance Gaussian distributions to model the cepstral features, and delta cepstral features (the differences between cepstal features at one frame and the immediately prior frame), that are emitted at each state of the HMM model. HMM scorer 1030 computes HMM scores 1060 for each of the word sequence hypotheses.

A word hypothesis sorter 1070, then takes the HMM scores to reorder the hypotheses according to their HMM scores and produce sorted N-best list 826. Word hypothesis sorter 1070 can also take the scores provided for each hypothesis by first pass 810, and combine them with the HMM scores to determine sorted N-best list 826. In an alternative embodiment, only the best scoring word sequence is retained rather than providing the entire N-best list.

In addition to sorting the word hypotheses, a confidence scorer 1072 determines a score for each word sequence that is related to the certainty that the caller actually uttered those words. The score depends both on the phonetic classification scores determined by the preliminary recognizer, as well as the result from the HMM scorer. Based on the best word sequence chosen by word hypothesis sorter 170, an average phoneme score, as calculated by phonetic scorer 630, for the phonetic sequence associated with that word sequence is computed. Then for each of the word sequences considered by HMM scorer 1030, the ratio of the HMM likelihood (the exponential of the log likelihood score) for that word sequence over the sum of all the HMM likelihoods is computed. This ratio is multiplied by the average phoneme score to yield the confidence for that word sequence.

Note that final modules 220 (FIG. 2) includes multiple final recognizers 222. Phonetic parameters 811 shown in FIG. 8 are shared among the final recognizers, thereby reducing the total amount of memory required on the general purpose computer.

In an alternative embodiment, rather than computing a list of possible word sequence, first pass 810 instead provides a graph of possible word sequences. This graph is computed using dynamic programming lattice 900 in a manner similar to that used to compute the list of best hypotheses in the previously described embodiment. However, rather than determining the best scoring phoneme sequences during the A* search, the individual starting and ending times of words corresponding to those best phoneme sequences are recorded. These words are arranged in a graph such that any word with a starting time equal to the ending time of another word can follow that other word if it is an allowed sequence of words. Therefore, all the word sequences that correspond to the best phoneme sequences are associated with paths through the word graph. In addition, paths through the graph may correspond to word sequences that do not correspond to any of the best phoneme sequences taken individually. In this alternative embodiment, HMM graph builder 1010 takes the word graph produced by first pass 810 and constructs a single HMM graph 1020 rather than a separate HMM graph for each word sequence hypothesis as in the previous embodiment. HMM scorer 1030 scores paths through HMM graph 1020 and determines the best scoring word sequences which it provides directly to sorted N-best list 826.

As introduced above, HMM recognizer 820 can use different subword units than preliminary recognizer 810. In the above embodiments, the English language phonemes are used as the subword units. In alternative embodiments, subword units can include phonemes, phoneme pairs (diphones), context-dependent phonemes (triphones), syllables, and non-linguistically based units, such as portions of words.

Other embodiments use alternative approaches to implement various components of the recognition system described above. In particular, alternative implementations of preliminary recognizer 214 can be used to compute segment intervals and scores of phonemes spanning those intervals. A dynamic programming algorithm is used in preliminary recognizer 214 to introduce constraints or weighting on phoneme sequences. Also, rather than using a two step approach of boundary classification followed by phoneme classification, an HMM or similar dynamic programming based algorithm can be used. In that approach, for each frame received by preliminary recognizer 214, a dynamic programming algorithm is used to update a lattice of scores. The dynamic programming algorithm can be a Viterbi speech recognition algorithm, with HMM state scores being determined using statistical models or ANNs. Based on the lattice scores computed up to a given time, segment intervals ending at or prior to that time, and associated phoneme scores for those segment intervals, are determined and passed to a corresponding final recognizer 222.

In the above embodiments, three channels are supported by each DSP. The number of channels can be configured at boot time. In addition, the sizes of the input and feature queues can be set to best match the applications that will be supported. For example, in an application in which only short prompts are provided, a smaller number of channels can be supported by each DSP than in an application in which very long prompts are provided. In the latter case, the preliminary recognizer may be typically waiting for some caller to speak, rather than having a backlog of data in the feature queues.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. Software stored on a computer readable medium for causing a multiprocessor computer to perform the function of recognizing an utterance spoken by a speaker, including:

software for causing a first processor to perform the functions of:

computing a series of segments associated with the utterance, each segment having a time interval with the utterance, and a plurality of scores characterizing the degree of match of the utterance in that time interval with a first plurality of subword units, and sharing a portion of the series of segments with a second processor; and software for causing a second processor to perform the functions of:

determining a plurality of word sequences hypotheses associated with the utterance, computing scores for the plurality of word sequence hypotheses, using a second plurality of subword units to represent words in the word sequence hypotheses, recognizing the utterance using the scores, wherein the first and second processors are substantially independent and asynchronous of each other, and wherein the first plurality of subword units is a set of phonemes, and the second plurality of subword units is a set of context dependent phonemes.

2. The software of claim 1 wherein computing scores for plurality of word sequence hypotheses includes:

forming a graph representation from the word sequence hypotheses, wherein the graph representation includes representations of words using the second plurality of subword units; and computing scores for a plurality of paths through the graph representation.

3. The software of claim 1 wherein determining the plurality of word sequence hypotheses includes determining a word graph representation wherein each of the word sequence hypotheses is associated with a path through the graph representation.

4. A method for recognizing the words in a spoken utterance, comprising;

accepting data for the spoken utterance;

forming a shared series of segments associated with the utterance, each segment having a time interval within the utterance, and a plurality of scores characterizing the degree of match of the utterance in that time interval with a first plurality of subword units;

based on the series of segments determining a plurality of word sequence hypotheses associated with the utterance;

computing scores for the plurality of word sequence hypotheses, using a second plurality of subword units to represent words in the word sequence hypotheses; and recognizing the utterance using the scores, wherein the determining of the plurality of word sequences is effected substantially asynchronous to the forming of series of segments and wherein the first plurality of subword units is a set of phonemes, and the second plurality of subword units is a set of context dependent phonemes.

5. The method of claim 4 wherein computing scores for the plurality of word sequence hypotheses includes:

forming a graph representation from the word sequence hypotheses, wherein the graph representation includes representations of words using the second plurality of subword units; and computing scores for a plurality of paths through the graph representation.

6. The method of claim 5 wherein computing scores for a plurality of paths through the graph representation includes scoring the paths using a hidden Markov model based algorithm.

7. The method of claim 4 wherein determining the plurality of word sequence hypotheses includes determining a list of word sequences.

8. The method of claim 4 wherein determining the plurality of word sequence hypotheses includes determining a word graph representation wherein each of the word sequence hypotheses is associated with a path through the graph representation.

9. An apparatus for recognizing utterances received on a plurality of communication channels, comprising:

a plurality of processors, each programmed to concurrently process utterances from multiple of the plurality of communication channels, including forming a series of segments associated with each utterance, each segment having a time interval within the utterance, and a plurality of scores characterizing the degree of match of the utterance in that time interval with a first plurality of subword units; and a processor programmed to accept a portion of the series of segments formed by the plurality of processors for each utterance, to determine a plurality of word sequence hypotheses associated with the utterance, to compute scores for the plurality of word sequence hypotheses, to recognize the utterance using the scores;

wherein the processor is substantially independent of an asynchronous to the plurality of processors and wherein the first plurality of subword units is a set of phonemes, and the second plurality of subword units is a set of context dependent phonemes.

* * * * *